(12) United States Patent
Otsuka et al.

(10) Patent No.: US 7,300,643 B2
(45) Date of Patent: Nov. 27, 2007

(54) METHOD FOR PRODUCING HYDROGEN AND APPARATUS FOR SUPPLYING HYDROGEN

(75) Inventors: Kiyoshi Otsuka, Saitama (JP); Sakae Takenaka, Tokyo (JP); Kiyozumi Nakamura, Saitama (JP); Kazuyuki Iizuka, Saitama (JP)

(73) Assignees: Uchiya Thermostat Co., Ltd., Misato-Shi (JP); Kiyoshi Otsuka, Toda-Shi (JP)

( * ) Notice: Subject to any disclaimer, the term of this patent is extended or adjusted under 35 U.S.C. 154(b) by 205 days.

(21) Appl. No.: 10/473,191

(22) PCT Filed: Apr. 1, 2002

(86) PCT No.: PCT/JP02/03257

§ 371 (c)(1),
(2), (4) Date: Sep. 25, 2003

(87) PCT Pub. No.: WO02/081368

PCT Pub. Date: Oct. 17, 2002

(65) Prior Publication Data

US 2004/0101474 A1   May 27, 2004

(30) Foreign Application Priority Data

Apr. 2, 2001   (JP)   ............... 2001-102845

(51) Int. Cl.
*B01J 7/00*   (2006.01)
*C01B 3/10*   (2006.01)
(52) U.S. Cl. .................... 423/658; 48/61; 48/118.5; 423/657
(58) Field of Classification Search ............... 423/657, 423/658; 48/61, 118.5
See application file for complete search history.

(56) References Cited

U.S. PATENT DOCUMENTS

| | | | | |
|---|---|---|---|---|
| 3,993,577 A | * | 11/1976 | Black et al. | ............ 252/188.25 |
| 4,005,185 A | * | 1/1977 | Ishizaka | ..................... 423/657 |
| 4,132,627 A | | 1/1979 | Leas | |
| 5,690,902 A | * | 11/1997 | Werth | ......................... 423/658 |
| 5,830,426 A | * | 11/1998 | Werth | ......................... 423/658 |

(Continued)

FOREIGN PATENT DOCUMENTS

CN   1113997   12/1995

(Continued)

OTHER PUBLICATIONS

Webster's New Collegiate Dictionary (1979), G.& C. Merriam Company, p. 171. (no month).*

(Continued)

*Primary Examiner*—Wayne A. Langel
(74) *Attorney, Agent, or Firm*—Greer, Burns & Crain, Ltd

(57) ABSTRACT

With a method producing hydrogen by making iron or iron oxide contact water, water vapor, or a gas including water vapor, a hydrogen generating medium, which has a high hydrogen generation reaction rate and is resistant to a repetition of oxidation-reduction without degrading its activity, is provided by adding a different metal (such as Ti, Zr, V, Nb, Cr, Mo, Al, Ga, Mg, Sc, Ni, Cu, etc.) other than the iron to the iron or the iron oxide.

7 Claims, 8 Drawing Sheets

U.S. PATENT DOCUMENTS

| | | | | | |
|---|---|---|---|---|---|
| 5,840,270 | A | * | 11/1998 | Werth | 423/658 |
| 6,322,723 | B1 | * | 11/2001 | Thomas | 252/188.25 |
| 6,682,714 | B2 | * | 1/2004 | Kindig et al. | 423/657 |
| 6,869,585 | B2 | * | 3/2005 | Otsuka et al. | 423/651 |

FOREIGN PATENT DOCUMENTS

| | | |
|---|---|---|
| FR | 1083006 | 1/1955 |
| FR | 2286102 | 4/1976 |
| GB | 191022126 | 9/1910 |
| GB | 191100401 | 7/1911 |
| GB | 191109623 | 11/1911 |
| JP | 30-871 | 2/1955 |
| JP | 52-37595 | 3/1977 |
| JP | 52-78692 | 7/1977 |
| JP | 55-42222 | 3/1980 |
| JP | 3-267558 | 11/1991 |
| JP | 4-100518 | 4/1992 |
| JP | 7-48127 | 2/1995 |
| JP | 7-267601 | 10/1995 |
| JP | 11-322301 | 11/1999 |
| JP | 2001-270701 | 10/2001 |
| JP | 2002-104801 | 4/2002 |
| WO | WO 9322044 | 11/1993 |
| WO | 01/96233 * | 6/2001 |

OTHER PUBLICATIONS

Kagakukougaku Binran (Chemical Engineering Handbook), The Society of Chemical Engineers, Japan, 1999, pp. 992-993 (translation attached), no month.

"Trace (konscki)," Encyclopedia of Chemistry (Kagaku Daijiten), Tokyo Kagaku Doujin, 1$^{st}$ ed., 1989, no month.

* cited by examiner

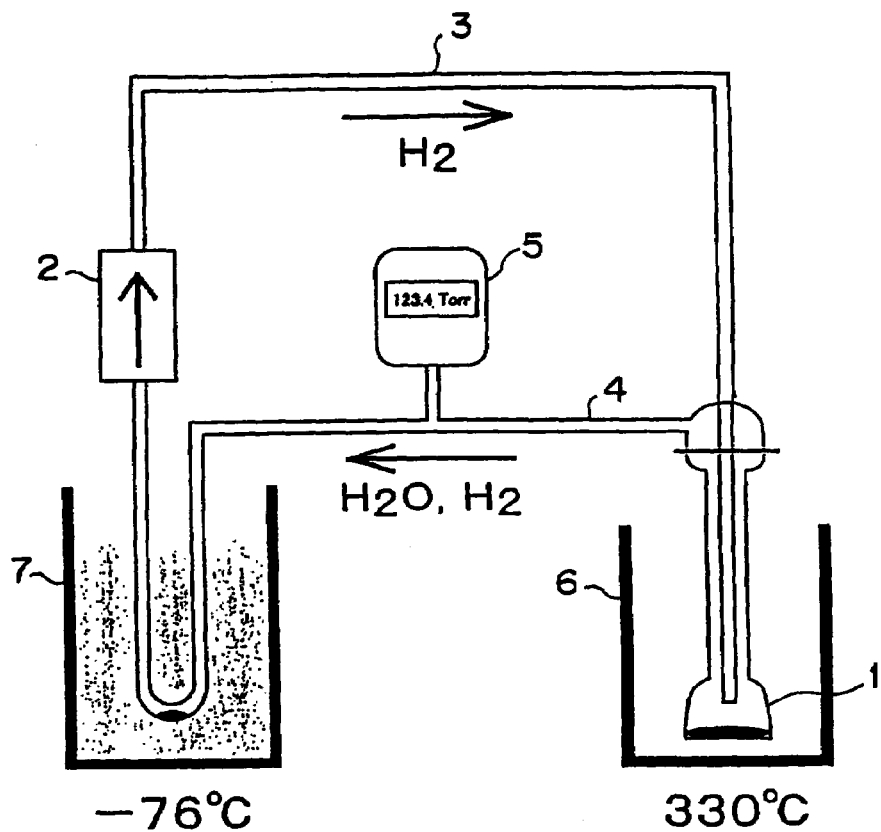
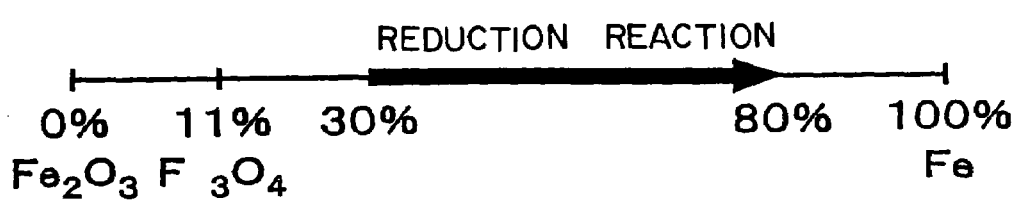
F I G. 1 A

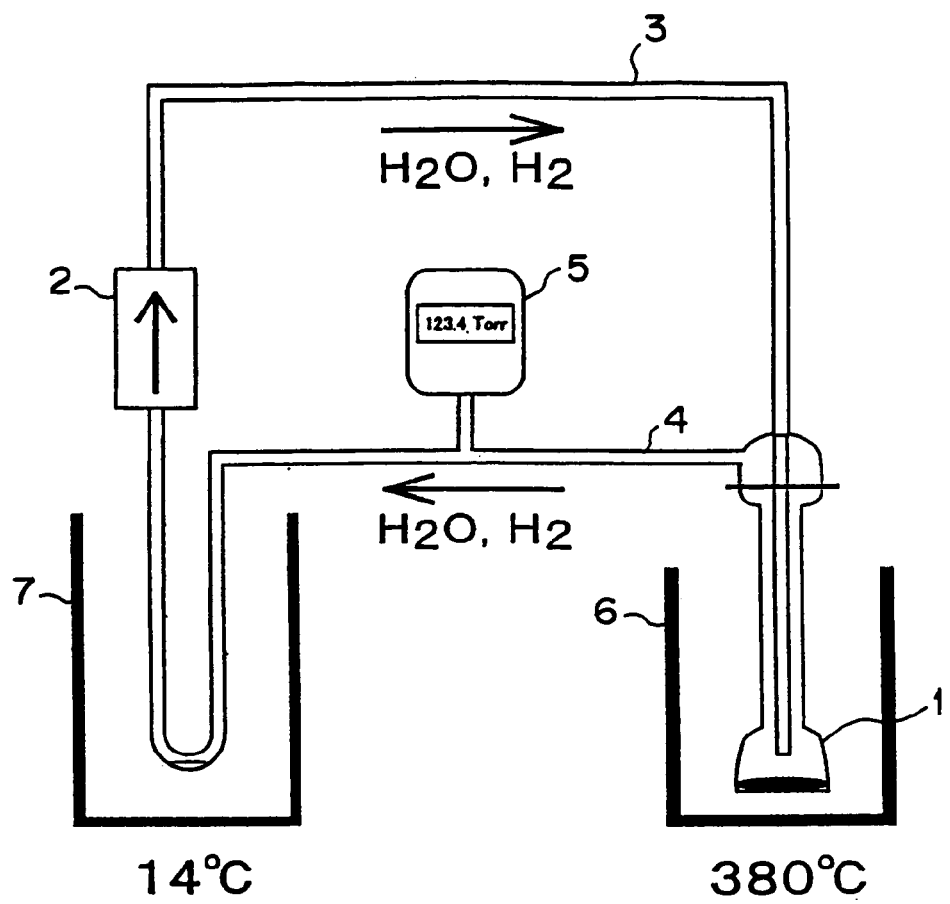
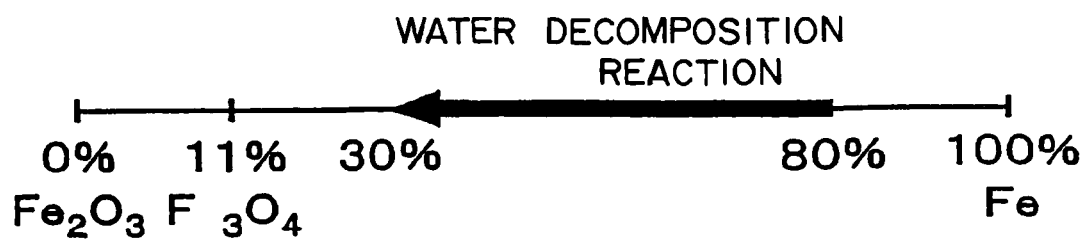
F I G. 1B

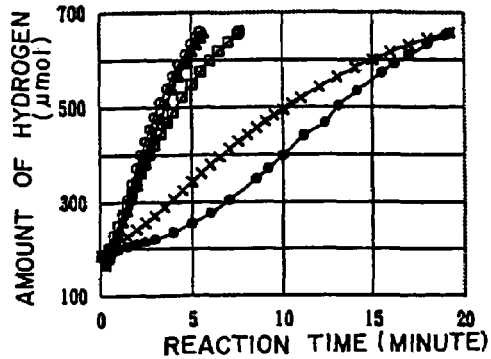
FIG.2A FIRST WATER DECOMPOSITION REACTION
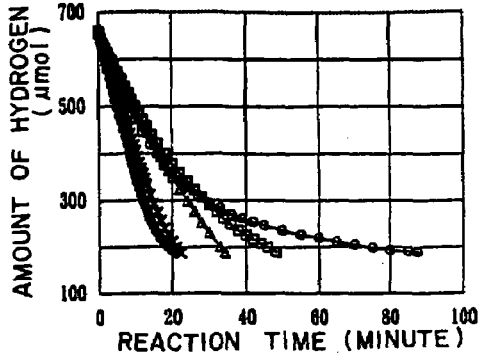
FIG.2B FIRST REDUCTION REACTION
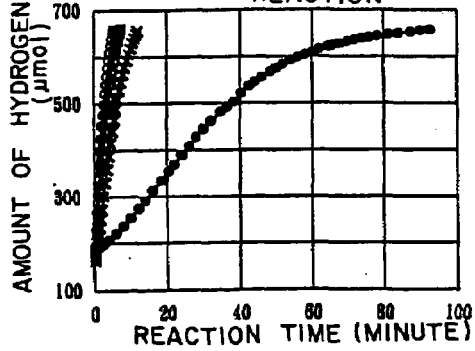
FIG.2C SECOND WATER DECOMPOSITION REACTION
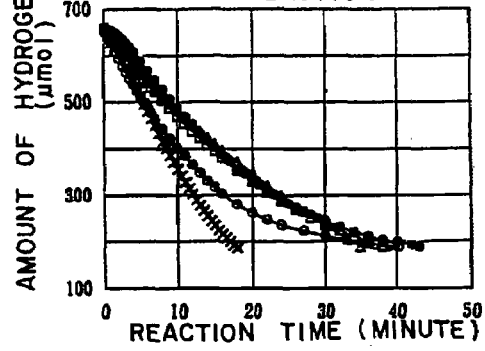
FIG.2D SECOND REDUCTION REACTION
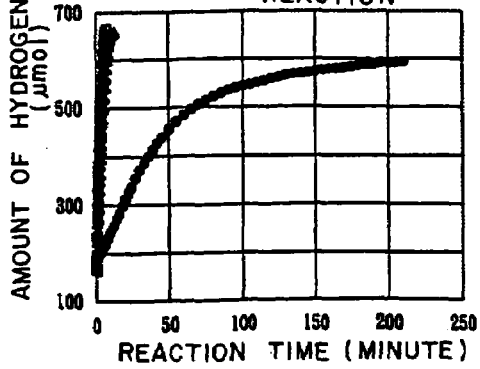
FIG.2E THIRD WATER DECOMPOSITION REACTION
MARK ○ : IRON OXIDE WITH Ga ADDED
MARK △ : IRON OXIDE WITH Mo ADDED
MARK □ : IRON OXIDE WITH Al ADDED
MARK × : IRON OXIDE WITH Zr ADDED
MARK ● : ONLY IRON OXIDE (NO ADDITIVES)

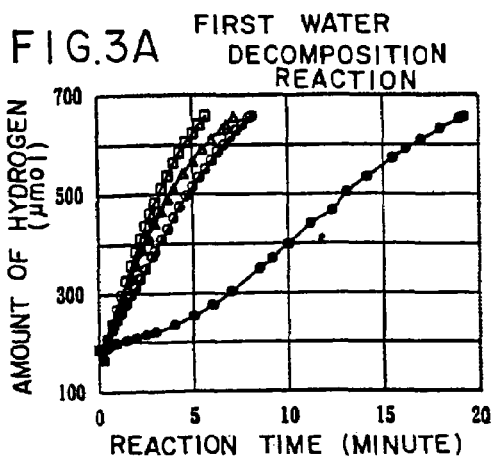
FIG.3A FIRST WATER DECOMPOSITION REACTION
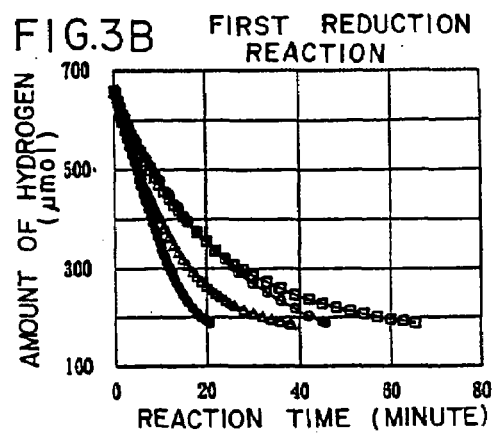
FIG.3B FIRST REDUCTION REACTION
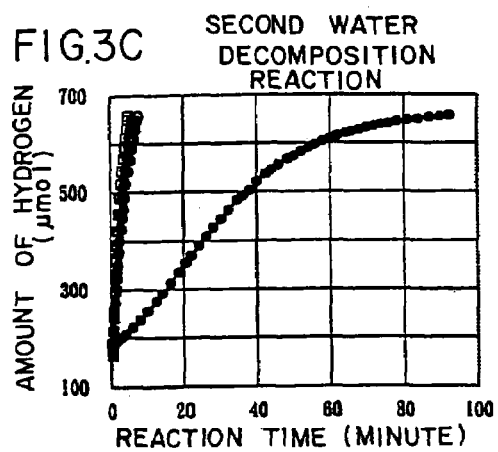
FIG.3C SECOND WATER DECOMPOSITION REACTION
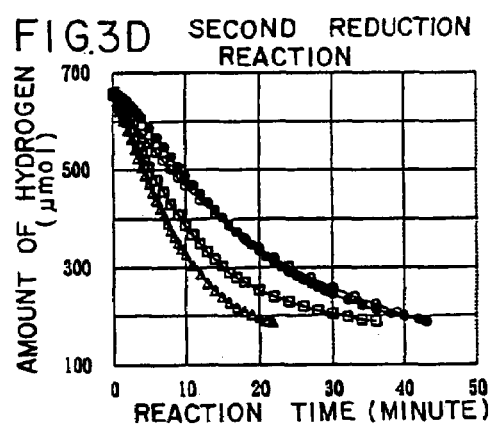
FIG.3D SECOND REDUCTION REACTION
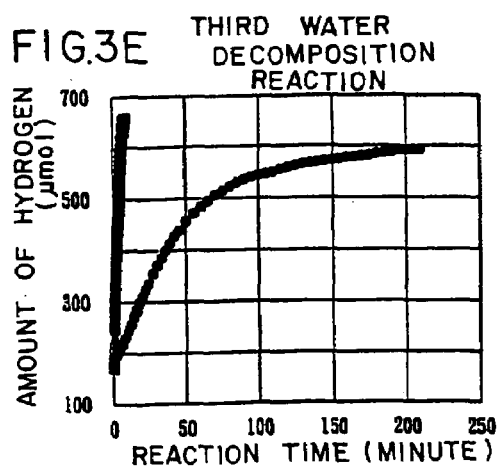
FIG.3E THIRD WATER DECOMPOSITION REACTION
MARK O : IRON OXIDE WITH Sc ADDED
MARK △ : IRON OXIDE WITH Cr ADDED
MARK □ : IRON OXIDE WITH V ADDED
MARK ● : ONLY IRON OXIDE (NO ADDITIVES)

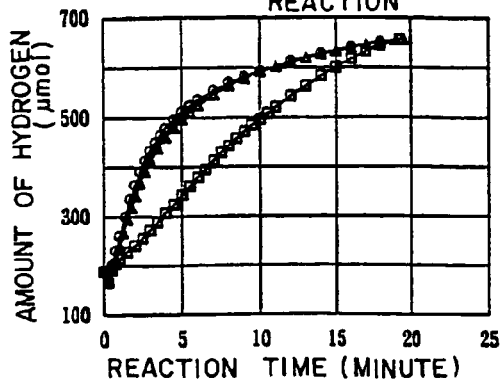

FIG.5A FIRST WATER DECOMPOSITION REACTION

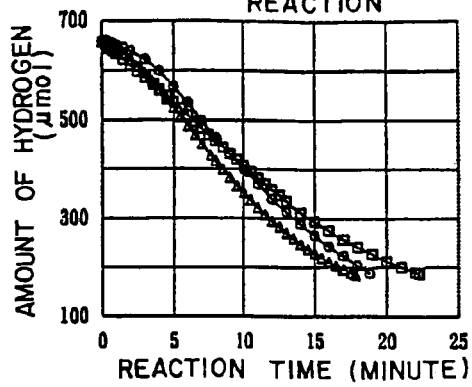

FIG.5B FIRST REDUCTION REACTION

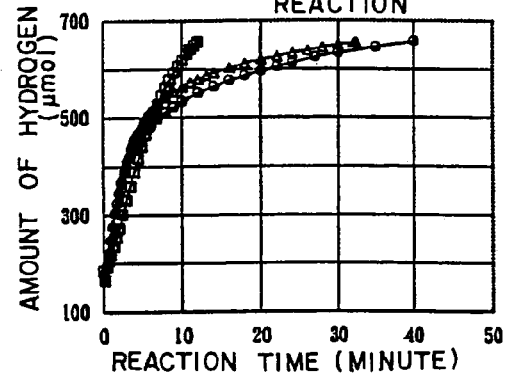

FIG.5C SECOND WATER DECOMPOSITION REACTION

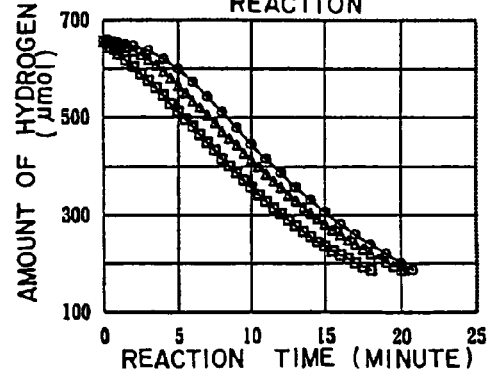

FIG.5D SECOND REDUCTION REACTION

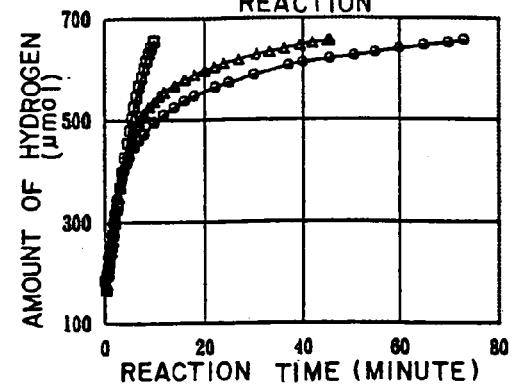

FIG.5E THIRD WATER DECOMPOSITION REACTION

MARK □: IRON OXIDE WITH Zr ADDED PREPARED WITH COPRECIPITATION METHOD (UREA METHOD)
MARK △: IRON OXIDE WITH Zr ADDED (PREPARED WITH IMPREGNATION METHOD)
MARK ○: $Fe_2O_3$ POWDER REAGENT (WAKO PURE CHEMICAL INDUSTRIES, LTD.)

METHOD FOR PRODUCING HYDROGEN AND APPARATUS FOR SUPPLYING HYDROGEN

TECHNICAL FIELD

The present invention relates to a technique decomposing water, and efficiently producing hydrogen.

BACKGROUND ART

Partial oxidation or water vapor reforming, which uses oil or natural gas as a raw material, generates a lot of carbon dioxide gas at the time of hydrogen synthesis. Therefore, a UT-3 cycle using solar heat, and a method disclosed by Japanese Patent Publication No. 07-267601 are proposed as a method that does not generate a carbon dioxide gas. However, this method requires a large-scale system in order to use solar heat, and also the cost of the large-scale system becomes very high.

Additionally, many proposals using a hydrogen storing alloy are made as means for safely storing/carrying hydrogen instead of a high-pressure steel bottle. However, there are problems that a high hydrogen pressure is required to make a hydrogen storing alloy occlude hydrogen, and the hydrogen storing alloy cannot be used in an atmosphere of air and water vapor, which costs very high.

For a fuel cell using hydrogen and air as raw materials, a method supplying hydrogen with methanol or gasoline steam reforming is general, and a number of inventions are made. With these methods, however, carbon monoxide and a carbon dioxide gas occur simultaneously. Especially, for carbon monoxide, a device for reducing carbon monoxide to 10 ppm or less is required due to a problem that an electrode of a fuel cell is poisoned, which leads to a high cost.

As a method producing hydrogen from water, a steam iron method is known. This method is a method using oxidation-reduction (Fe→FeO(Fe$_3$O$_4$)→Fe) of only iron as a reaction. For the reaction, a temperature, by way of example, equal to or higher than 600° C. is required. If oxidation-reduction is repeated, there is a disadvantage that so-called sintering which agglomerates metallic iron occurs, and the activity of the metallic iron is rapidly degraded. Accordingly, a hydrogen generating medium (oxidation-reduction material) which does not make a sintering phenomenon occur, is superior in resistance, and exhibits high activity is demanded.

DISCLOSURE OF INVENTION

An object of the present invention is to provide a method efficiently decomposing water and producing hydrogen by providing a hydrogen generating medium (oxidation-reduction material) that has a high hydrogen generation reaction rate, and is resistant to a repetition of oxidation-reduction without degrading its activity.

The method producing hydrogen by making iron or iron oxide contact water, water vapor, or a gas including water vapor is characterized in that a different metal other than the iron is added to the iron or the iron oxide as recited in claim 1, in order to achieve the above described object.

In the present invention, water used as a raw material may not always be purified water, but tap water, industrial water, or the like is used.

Additionally, for the iron used in the present invention, pure iron, iron oxide, or an iron compound such as iron nitrate, etc. is used as a raw material.

Furthermore, a metal added and used in the present invention is at least one of metals of the fourth family, the fifth family, the sixth family, and the thirteenth family of the IUPAC periodic table. Desirably, a selection is made from among Ti, Zr, V, Nb, Cr, Mo, Al, and Ga. Or, any of Mg, Sc, Ni, and Cu is available.

The amount of addition of a different metal added to iron or iron oxide is calculated with the number of moles of atoms of the metal. Desirably, the amount of addition is prepared to be 0.5 to 30 mol % of atoms of all metals. More desirably, the amount of addition is prepared to be 0.5 to 15 mol %.

A metal adding method is implemented by a physical mixture or an impregnation method, or desirably, a coprecipitation method. For a prepared iron compound, a shape having a large surface area such as powder state, pellet type, cylindrical shape, honeycomb structure, nonwoven fabric form, etc., which is suitable for reaction, is selected to be efficiently used, and utilized for a decomposition reaction of water.

This iron compound is included in a reactor, and reduced with hydrogen, etc. Hydrogen is produced by making the reduced iron compound contact water, water vapor, or a gas including water vapor. At this time, the iron which reacts with water becomes iron oxide. Note that this oxidation/reduction reaction can be also made at a low temperature of 600° C. or lower.

According to the present invention, hydrogen can be supplied at low cost without generating carbon monoxide, which poisons the electrode of a fuel cell, to a fuel cell for a local facility, a plant, home, or a vehicle. The produced hydrogen is used not only for a fuel cell but also as an extensible hydrogen supplying means such as a hydrogen burner, etc. Additionally, the reduced iron compound is filled in a container, which is made available as a hydrogen supplying means to the above described fuel cell, etc. in the form of a portable hydrogen supplying cassette.

Furthermore, according to the present invention, a hydrogen supplying apparatus is configured by a portable cassette, which includes a hydrogen generating medium inside and comprises at least two pipe installing means, wherein a main component of the hydrogen generating medium is iron or iron oxide, to which a different metal is added, and the cassette, into which water or water vapor is poured via one of the pipe installing means, can supply hydrogen produced by decomposing the water to a hydrogen consuming device from the other communicating pore pipe installing means is provided.

A heater may be arranged within the cassette. Furthermore, a pipe that supplies inert gas or air may be arranged in the cassette.

Iron oxidized by reacting with water is again reduced by hydrogen, etc., and repeatedly available as an oxidation-reduction medium without degrading its activity.

As the reason that the above described effects can be obtained, prevention of sintering, promotion of an oxygen diffusion rate within a solid, an improvement in a water decomposition activity on a surface, etc. are considered.

BRIEF DESCRIPTION OF DRAWINGS

FIGS. 1A and 1B are schematic views of a reaction system of an iron compound used in a preferred embodiment of the present invention, and respectively show a reduction reaction process and a water decomposition reaction process;

FIGS. 2A to 2E are schematics showing the states of a water decomposition reaction and a reduction reaction in the case of iron oxide with Ga added, iron oxide with Mo added, iron oxide with Al added, iron oxide with Zr added, and only iron oxide, FIGS. 2A, 2C, and 2E respectively show a first, a second, and a third water decomposition reaction, and FIGS. 2B and 2D respectively show a first and a second reduction reaction;

FIGS. 3A to 3E show the states of a water decomposition reaction and a reduction reaction in the case of iron oxide with Sc added, iron oxide with Cr added, iron oxide with V added, and only iron oxide, FIGS. 3A, 3C, and 3E respectively show a first, a second, and a third water decomposition reaction, and FIGS. 3B and 3D respectively show a first and a second reduction reaction;

FIGS. 5A to 5E show the effects produced by a metal adding method according to the present invention, FIGS. 5A, 5C, and 5E respectively show a first, a second, and a third water decomposition reaction, and FIGS. 5B and 5D respectively show a first and a second reduction reaction;

BEST MODE OF CARRYING OUT THE INVENTION

Figure 4:
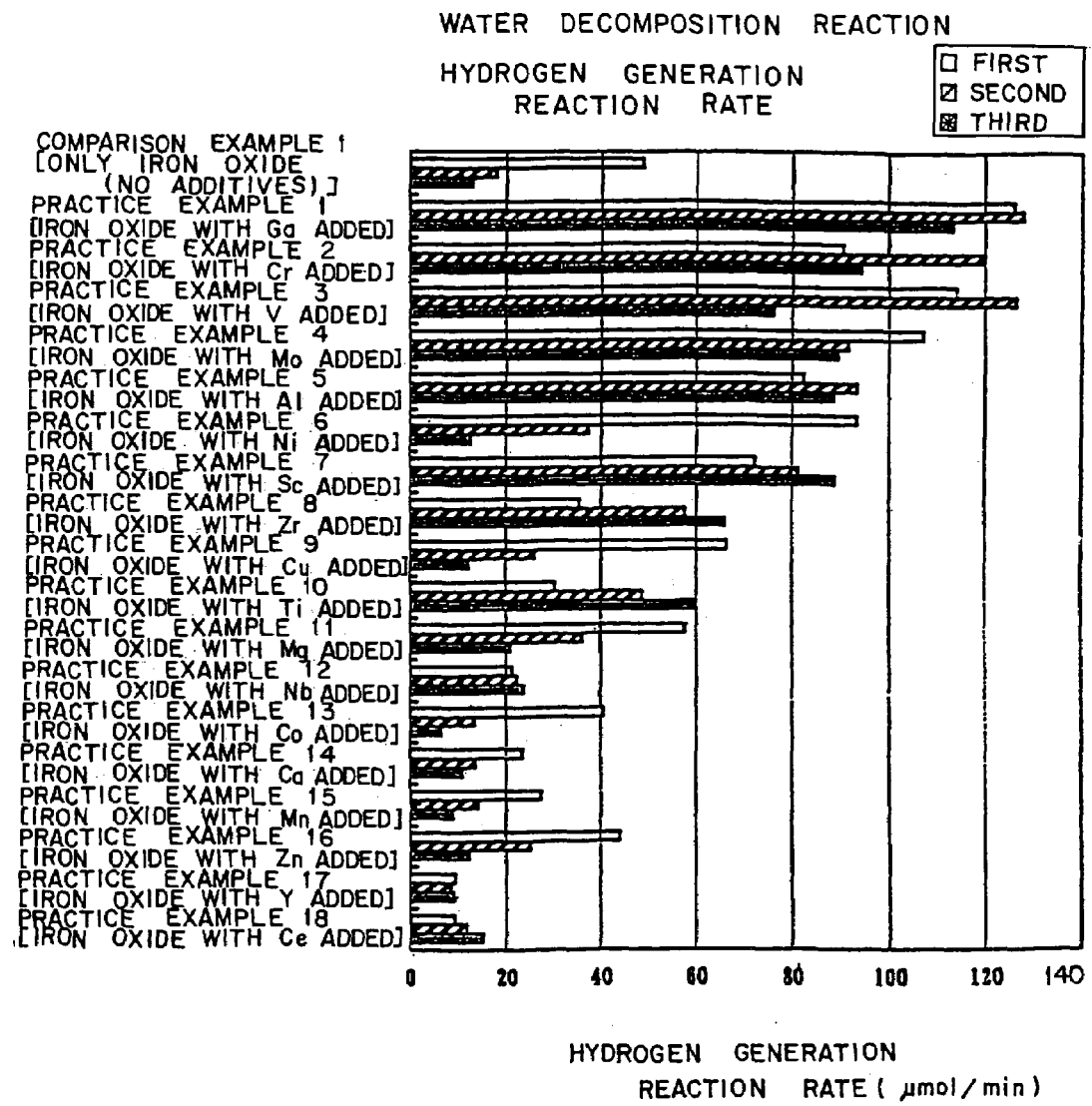
FIG. 4 is a graph representing hydrogen generation reaction rates at the time of water decomposition reaction.

Schematic views of a reaction system of an iron compound used in one preferred embodiment of the present invention are shown in FIGS. 1A and 1B. FIG. 1A shows a reduction reaction process, whereas FIG. 1B shows a water decomposition reaction process implemented by the iron compound reduced in FIG. 1A, and water vapor. The apparatus shown in FIGS. 1A and 1B configures a closed gas circulatory system reaction apparatus by connecting a reactor 1 and a gas circulatory pump 2 with glass pipes 3 and 4. Additionally, a pressure indicator 5 measuring the pressure of a gas within the system is connected to the glass pipe 4. By measuring the pressure of the gas within the system with the pressure indicator 5, the amount of reduction (an amount calculated from the amount of consumption of hydrogen used for the reduction), etc. can be measured.

In the reduction reaction process shown in FIG. 1A, the reactor 1 is heated to, for example, on the order of 330° C. by an electric furnace 6, and the following reduction reaction occurs.

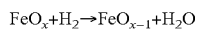
$FeO_x + H_2 \rightarrow FeO_{x-1} + H_2O$

A water vapor trap 7 is arranged in the downstream of the reactor 1. This water vapor trap 7 is cooled down by dry-ice ethanol, and the temperature of the dry ice is set to, for example, on the order of −76° C. Water generated by the above described reduction reaction is coagulated within the water vapor trap 7, and removed from the system.

In the water decomposition reaction process shown in FIG. 1B, the reactor 1 is heated to, for example, on the order of 380° C. by the electric furnace 6, and the following water decomposition reaction occurs.

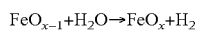
$FeO_{x-1} + H_2O \rightarrow FeO_x + H_2$

The water coagulated by the water vapor trap device 7 (water generated by reducing the iron compound) shown in FIG. 1A is evaporated by being warmed with cold water, for example, to 14° C. this time.

The iron compound included in the reactor 1 is prepared with the following coprecipitation method (urea method). Namely, 0.0194 mol of iron nitrate(III) 9-hydrate ($Fe(NO_3)_3 \cdot 9H_2O$: manufactured by Wako Pure Chemical Industries, Ltd.), 0.0006 mol of nitrate salt of added gallium ($Ga(NO_3)_3 \cdot nH_2O$: manufactured by Wako Pure Chemical Industries, Ltd.), and 1.0 mol of urea as a precipitant are added and dissolved in 1 liter of water deaerated by ultrasonic wave for 5 minutes. The mixed solution is heated to 90° C. while being stirred, and kept to be the same temperature for 3 hours. After the reaction terminates, the solution is left untouched and precipitated for 48 hours, and suction-filtrated. The precipitate is dried at 80° C. for approximately 24 hours. Thereafter, the precipitate is air-burned at 300° C. for 3 hours, and at 500° C. for 10 hours. The amount of iron within the sample is checkweighed to be 50 mg as ferric oxide ($Fe_2O_3$), and atoms of the added metal are prepared to be 3 mol % of atoms of all metals.

Before the reduction reaction with hydrogen is made, the sample is included in the reactor 1, and vacuum-pumped for 30 minutes after being heated to 400° C. Oxygen having a partial pressure of approximately 8.0 kPa is made to contact the sample for 1 hour so as to be completely oxidized. Thereafter, vacuum pumping for 30 minutes or more is again performed until the degree of vacuum reaches $1.3 \times 10^{-5}$ kPa or lower. In a preferred embodiment to be described below, vacuum pumping for 30 minutes or more is performed until the degree of vacuum reaches $1.3 \times 10^{-5}$ kPa or lower, before the reduction reaction and the water decomposition reaction for producing hydrogen by making water vapor contact.

Next, the reduction reaction shown in FIG. 1A is made as follows. Namely, hydrogen is introduced to the apparatus so that the initial pressure becomes 33.3 kPa, and the hydrogen is made to contact the sample at 330° C. The degree of reduction is estimated with the amount of consumption of the hydrogen within the system, and the reaction is terminated when ferric oxide ($Fe_2O_3$) within the sample reaches the degree of reduction 80% (the amount of hydrogen within the system is approximately 190 μmol). The degree of reduction referred to here is a numeric value converted on the assumption that the state of the ferric oxide ($Fe_2O_3$) is the degree of reduction 0%, and the state of metallic iron (Fe) is the degree of reduction 100% as shown in a lower portion of FIG. 1A.

After the reduction reaction with hydrogen is terminated, the water decomposition reaction shown in FIG. 1B is made as follows. Namely, water is introduced to the apparatus, and the introduced water and the water generated by the reduction reaction are combined to be $9.39 \times 10^{-4}$ mol, and kept to be 14° C. At this time, the pressure of water vapor is approximately 1.5 kPa. Argon is introduced so that its initial pressure becomes 12.5 kPa. After the argon is circulated for 10 minutes, it is made to contact the sample at 380° C. The degree of reduction is estimated with the amount of generation of hydrogen within the system, and the reaction is terminated when the degree of reduction of iron oxide within the sample is restored to 30% (the amount of hydrogen within the system is approximately 660 μmol)

After the above described water decomposition reaction is terminated, the reduction reaction is again made, and the water decomposition reaction is made 3 times in total. States of the water decomposition reaction and the reduction reaction in practical examples of iron oxide with Ga added (marked with ○), iron oxide with Mo added (marked with Δ), iron oxide with Al added (marked with □), and iron oxide with Zr added (marked with x) are shown in FIGS. 2A to 2E. A mark ● in FIGS. 2A to 2E shows a comparison example of a result of using only iron oxide prepared with a coprecipitation method (urea method) for the water decomposition/reduction reaction. Also this example is prepared under a condition similar to the above described one.

That is, in FIG. 2A, for example, a sample prepared by reducing iron oxide with gallium added, which is prepared with the above described coprecipitation method (urea method), to 80% is made to contact water vapor generated by evaporating water agglutinated from the water vapor trap device at a time 0 minute, so that hydrogen is generated (indicated by a mark ○ in FIG. 2A).

The reduced iron oxide with gallium added is again oxidized by oxygen which occurs due to water decomposition. The reaction is terminated when the degree of reduction of the iron oxide with gallium added reaches 30% (oxidized from 80 to 30%) (the amount of hydrogen within the system is approximately 660 μmol), and generated hydrogen is vacuum-pumped.

In FIG. 2B, hydrogen of approximately 660 μmol is newly introduced to the system, and the reduction reaction of the iron oxide with gallium added, which is oxidized in FIG. 2A, is made. The reaction is terminated when the degree of reduction of the iron oxide with gallium added reaches 80% while the hydrogen within the system is being consumed (the amount of hydrogen within the system is approximately 190 μmol).

FIG. 2C shows the second water decomposition reaction, FIG. 2D shows its subsequent reduction reaction, and FIG. 2E shows the third water decomposition reaction.

In FIG. 2C, with the water decomposition reaction only with iron oxide, it takes approximately 90 minutes that the amount of hydrogen within the system increases from approximately 190 μmol to approximately 660 μmol. In the meantime, with the water decomposition reaction with the iron oxide with gallium added according to the present invention, the amount of hydrogen can reach approximately 660 μmol for approximately 5 minutes.

In FIG. 2D, the reduction reaction of the iron oxide with gallium added according to the present invention can shorten its reaction time in comparison with the reduction reaction only with iron oxide.

In FIG. 2E showing the third water decomposition reaction, the water decomposition reaction only with iron oxide is not restored to approximately 660 μmol (the degree of reduction is 30%) although 210 minutes are elapsed. In the meantime, the water decomposition reaction using the iron oxide with gallium added according to the present invention can reach approximately 660 μmol (the degree of reduction is 30%) for approximately 5 minutes almost unchanged as the first water decomposition reaction.

States of the water decomposition reaction and the reduction reaction in the case of only iron oxide prepared with a coprecipitation method (urea method), and in the case of a sample to which metals (iron oxide with Sc added, iron oxide with Cr added, and iron oxide with V added) other than the metals added in FIGS. 2A to 2E are added are shown in FIGS. 3A to 3E.

It can be proved also from these results that the efficiency of the water decomposition/reduction reaction is significantly improved also by adding the metals such as Sc, Cr, V, etc.

Table 1 represents results obtained by comparing

Table 1 represents results obtained by comparing a hydrogen generation reaction rate (namely, a numerical value representing the slope of a curve from the amount of hydrogen approximately 280 to approximately 370 μmol (the degree of reduction 70 to 60%) within the system) at the time of the water decomposition reaction represented by the graphs shown in FIGS. 2A to 2E and 3A to 3E, and FIG. 4 is a graphical representation of Table 1. In Table 1 and FIG. 4, results of experiments similar to those shown in FIGS. 2A to 2E and 3A to 3E are depicted as practical examples 1 to 18 and a comparison example 1 along with the results obtained with the sample to which metals (Ni, Cu, Ti, Mg, Nb, Co, Ca, Mn, Zn, Y, and Ce) other than the above described metals are added.

TABLE 1

|  | MAIN MATERIAL (IRON NITRATE) | ADDITIVES | | WATER DECOMPOSITION REACTION RATE (μmol/min) | | |
|---|---|---|---|---|---|---|
|  |  | NAME OF ELEMENT | USED REAGENT | FIRST | SECOND | THIRD |
| COMPARISON EXAMPLE 1 | Fe (NO$_3$)$_3$•9H$_2$O | — | NO ADDITIVES | 48.9 | 17.7 | 12.8 |
| PRACTICAL EXAMPLE 1 | Fe (NO$_3$)$_3$•9H$_2$O | Ga | Ga(NO$_3$)$_3$•nH$_2$O | 126.2 | 128.0 | 113.4 |
| PRACTICAL EXAMPLE 2 | Fe (NO$_3$)$_3$•9H$_2$O | Cr | Cr(NO$_3$)$_3$•9H$_2$O | 90.4 | 119.5 | 94.2 |
| PRACTICAL EXAMPLE 3 | Fe (NO$_3$)$_3$•9H$_2$O | V | NH$_4$VO$_3$ | 114.2 | 126.5 | 75.8 |
| PRACTICAL EXAMPLE 4 | Fe (NO$_3$)$_3$•9H$_2$O | Mo | (NH$_4$)$_6$Mo$_7$O$_{24}$•4H$_2$O | 106.8 | 91.5 | 89.3 |
| PRACTICAL EXAMPLE 5 | Fe (NO$_3$)$_3$•9H$_2$O | Al | Al(NO$_3$)$_3$•9H$_2$O | 82.3 | 93.3 | 88.4 |
| PRACTICAL EXAMPLE 6 | Fe (NO$_3$)$_3$•9H$_2$O | Ni | Ni(NO$_3$)$_3$•6H$_2$O | 93.1 | 37.2 | 12.4 |
| PRACTICAL EXAMPLE 7 | Fe (NO$_3$)$_3$•9H$_2$O | Sc | Sc(NO$_3$)$_3$•4H$_2$O | 72.0 | 80.9 | 88.6 |
| PRACTICAL EXAMPLE 8 | Fe (NO$_3$)$_3$•9H$_2$O | Zr | ZrCl$_2$O•8H$_2$O | 35.5 | 57.5 | 65.7 |
| PRACTICAL EXAMPLE 9 | Fe (NO$_3$)$_3$•9H$_2$O | Cu | Cu(NO$_3$)$_2$•3H$_2$O | 66.1 | 26.0 | 12.0 |
| PRACTICAL EXAMPLE 10 | Fe (NO$_3$)$_3$•9H$_2$O | Ti | (NH$_4$)$_2$TiO(C$_2$O$_4$)$_2$•2H$_2$O | 30.2 | 48.9 | 59.7 |
| PRACTICAL EXAMPLE 11 | Fe (NO$_3$)$_3$•9H$_2$O | Mg | Mg(NO$_3$)$_2$•6H$_2$O | 57.7 | 36.0 | 20.9 |
| PRACTICAL EXAMPLE 12 | Fe (NO$_3$)$_3$•9H$_2$O | Nb | NIOBIUM OXALATE(18.6 wt % Nb$_2$O$_5$) | 21.2 | 22.2 | 23.7 |
| PRACTICAL EXAMPLE 13 | Fe (NO$_3$)$_3$•9H$_2$O | Co | Co(NO$_3$)$_2$•6H$_2$O | 40.4 | 13.2 | 6.3 |
| PRACTICAL EXAMPLE 14 | Fe (NO$_3$)$_3$•9H$_2$O | Ca | Ca(NO$_3$)$_2$•4H$_2$O | 23.4 | 13.4 | 10.5 |
| PRACTICAL EXAMPLE 15 | Fe (NO$_3$)$_3$•9H$_2$O | Mn | Mn(NO$_3$)$_2$•6H$_2$O | 27.3 | 14.0 | 8.6 |
| PRACTICAL EXAMPLE 16 | Fe (NO$_3$)$_3$•9H$_2$O | Zn | Zn(NO$_3$)$_2$•6H$_2$O | 44.0 | 25.1 | 12.0 |
| PRACTICAL EXAMPLE 17 | Fe (NO$_3$)$_3$•9H$_2$O | Y | Y(NO$_3$)$_3$•6H$_2$O | 9.1 | 8.2 | 8.9 |
| PRACTICAL EXAMPLE 18 | Fe (NO$_3$)$_3$•9H$_2$O | Ce | Ce(NO$_3$)$_3$•6H$_2$O | 9.0 | 11.6 | 15.0 |

It is proved from Table 1 and FIG. 4 that the hydrogen generation reaction rate is significantly improved, and also a degradation of the activity due to a repetition of the water decomposition reaction can be prevented according to the present invention which adds a metal other than iron to iron or iron oxide. Note that niobium (Nb) in a practical example 12 is a very stable substance the activity of which is not degraded by a repetition, although its first hydrogen generation reaction rate is not so high.

Furthermore, in the water decomposition reaction experiments in these practical examples, for added metals (Co, Ca, Mn, Zn, Y, and Ce), which are not included in claims 2 to 4, their hydrogen generation reaction rates do not become significantly high, but some of their activities are degraded slightly by a repetition of the water decomposition/reduction reaction experiment. In Table 1 and FIG. 4, the water decomposition/reduction reaction experiment is repeated only three times. However, an effect of improving the efficiency of hydrogen generation can possibly become high if the experiment is repeated many times. Therefore, a study is being made by conducting additional experiments at present.

Next, effects produced by the metal adding method according to the present invention are shown in FIGS. 5A to 5E. Namely, comparisons of the water decomposition/reduction reaction among a sample prepared by adding zirconium with a coprecipitation method (urea method), a sample prepared by adding zirconium with an impregnation method, and commercially available ferric oxide powder ($Fe_2O_3$: manufactured by Wako Pure Chemical Industries, Ltd.) are shown in FIGS. 5A to 5B.

As the coprecipitation method (urea method), a method similar to the above described one is executed, and its results are as described above.

A method adding zirconium with the impregnation method is executed as follows. $4.52 \times 10^{-4}$ mol of chloride salt of added zirconium ($ZrCl_2O \cdot 8H_2O$: manufactured by Kanto Kagaku) is dissolved in 60 ml of water, and 0.0146 mol of ferric oxide ($Fe_2O_3$: manufactured by Wako Pure Chemical industries, Ltd.) is added while being stirred at 80° C. After the solution is dried at 120° C., its precipitate is air-burned at 300° C. for 2 hours and at 500° C. for 5 hours.

With both of the coprecipitation method (urea method) and the impregnation method, atoms of the added zirconium are prepared to be 3 mol % of atoms of all metals, and the amount of iron is checkweighed to be 50 mg as ferric oxide ($Fe_2O_3$)

Furthermore, also the commercially available ferric oxide powder ($Fe_2O_3$: manufactured by Wako Pure Chemical Industries, Ltd.) is checkweighed to be 50 mg.

Note that a preprocess of the sample is performed as described above.

FIG. 5A shows the first water decomposition reaction made by introducing water vapor at a reaction time 0 minute, and by making a sample contact the water vapor to generate hydrogen.

FIG. 5B shows its subsequent reduction reaction, FIG. 5C shows the second water decomposition reaction, FIG. 5D shows its subsequent reduction reaction, and FIG. 5E shows the third water decomposition reaction.

In FIGS. 5A to 5E, □ indicates the water decomposition/reduction reaction of a sample prepared with a coprecipitation (urea) method, Δ indicates the water decomposition/reduction reaction of a sample prepared with an impregnation method, and ○ indicates the water decomposition/reduction reaction of commercially available ferric oxide powder.

As the number of times of the water decomposition reaction of the commercially available ferric oxide powder increases, the hydrogen generation reaction rate becomes lower, and a long time is required until the reaction reaches approximately 660 μmol (the degree of reduction is 30%). In the meantime, the water decomposition reaction of the sample prepared with the impregnation method reaches approximately 660 μmol in a shorter time than the water decomposition reaction of the commercially available ferric oxide powder. Furthermore, the time period during which the water decomposition reaction of the sample prepared with the coprecipitation method (urea method) becomes significantly short until the reaction reaches approximately 660 μmol. In FIG. 5E, the reaction reaches approximately 660 μmol in 10 minutes.

Furthermore, also the reduction reaction of the sample prepared with the coprecipitation method (urea method) requires shorter time than that of the reduction reaction of the commercially available ferric oxide powder until the reaction reaches approximately 190 μmol (the degree of reduction 80%) as shown in FIG. 5D.

As presented above, the water decomposition/reduction reaction efficiency of the sample prepared with the impregnation method becomes higher than that of the commercially available ferric oxide powder, and the water decomposition/reduction reaction of the sample prepared with the coprecipitation method (urea method) significantly increases in efficiency, and its activity is not degraded even if water decomposition/reduction is repeated.

Table 2 represents results of the hydrogen generation reaction rate when a water decomposition reaction is respectively made once at different temperatures (250° C. and 400° C.) by using a sample of only iron oxide and iron oxide with gallium added, which is prepared with a coprecipitation method (urea method) similar to the above described one (a method calculating the hydrogen generation reaction rate is similar to the above described one).

TABLE 2

| | MAIN MATERIAL (IRON NITRATE) | ADDITIVES NAME OF ELEMENT | ADDITIVES USED REAGENT | WATER DECOMPOSITION REACTION RATE (μmol/min) 250° C. | WATER DECOMPOSITION REACTION RATE (μmol/min) 400° C. |
|---|---|---|---|---|---|
| COMPARISON EXAMPLE 2 | $Fe(NO_3)_3 \cdot 9H_2O$ | — | NO ADDITIVES | 0.5 | 11.2 |
| PRACTICAL EXAMPLE 19 | $Fe(NO_3)_3 \cdot 9H_2O$ | Ga | $Ga(NO_3)_3 \cdot nH_2O$ | 13.3 | 169.1 |

As represented by Table 2, the reaction rate of the iron oxide with gallium added (practical example 19) becomes faster approximately 15 times the sample using only iron oxide (comparison example 2) at a reaction temperature of 400° C. Additionally, the reaction rate of the iron oxide with gallium added at 250° C. is close to that of the sample using only the iron oxide at 400° C. The reaction temperature is dropped by using the iron oxide with gallium added, which is very effective at reducing hydrogen supply energy to a system (such as a fuel cell, etc.) which requires hydrogen.

Figure 6:
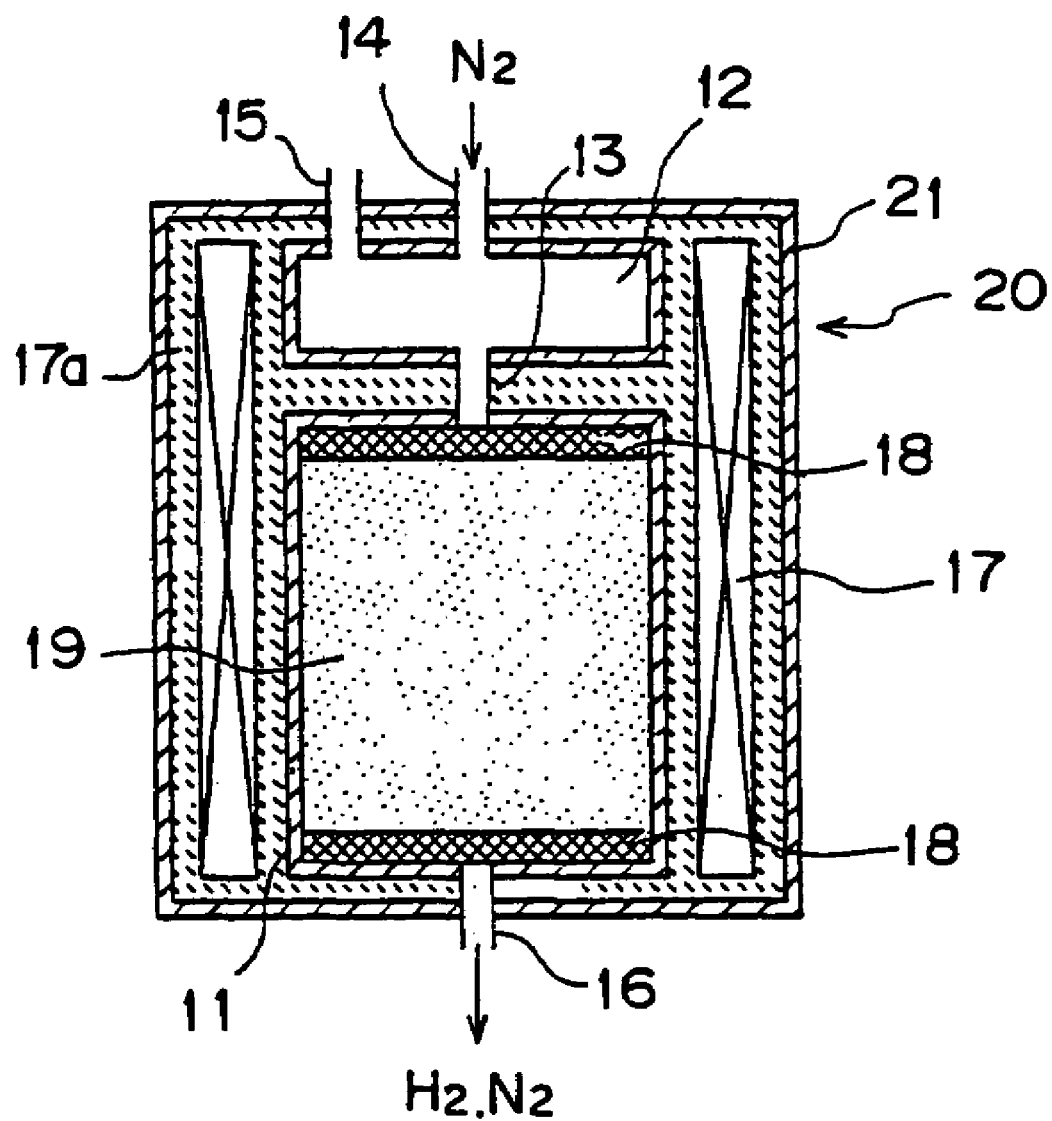
FIG. 6 shows a hydrogen supplying apparatus having a configuration where a reaction container in which an oxidation/reduction iron medium (iron oxide with a metal of the present invention added) is included, and a water supplying apparatus are connected with a pipe.

A preferred embodiment of a hydrogen supplying apparatus that adopts the method according to the present invention is shown in FIG. 6. The apparatus shown in FIG. 6 has a configuration where a reaction container 11 in which an oxidation/reduction iron medium (iron oxide to which a metal according to the present invention is added) 19 is included, and a device 12 for supplying water is connected with a pipe 13, and the whole of the configuration is structured as a cassette 20 for supplying hydrogen. In the above described practical examples, the experiments are conducted with the closed gas circulatory reaction device, whose reaction system is closed. However, the present invention can be used for the reaction of a gas distribution type as shown in FIG. 6.

The reaction container 11 which makes a water decomposition/reduction reaction is connected to the water supplying device 12 with the pipe 13, and the water supplying device 12 is connected to a pipe which introduces inert gas or air. As the inert gas, for example, nitrogen, argon, helium, etc. are used. Nitrogen (inert gas) is used as a carrier gas for smoothly making a reaction or to verge air (oxygen) within the system, but it is not always required. Also air is used as a carrier gas for smoothly making a reaction, and not always required. Water within the cassette 20 is sometimes connected to a pipe 15 so as to be filled in the water supplying device 12 from the outside of the cassette 20 depending on need.

The reaction container 11 is connected to a pipe 16 for emitting hydrogen or water vapor, makes a water decomposition reaction, and transmits generated hydrogen to a system such as a polymer electrolyte fuel cell, etc., which requires hydrogen. As a heat source which supplies heat for a water decomposition/reduction reaction or water evaporation, a heater 17 is arranged within the cassette 20. The heat source may be any of a generally used electric furnace, a heater, induction heat, catalytic combustion heat, and heat generated by chemical reaction. The reaction container 11 is made of a metal such as stainless steel, aluminum, etc., ceramic such as alumina, zirconia, etc., heat-resistant plastic such as phenol, polyphenylene sulfide, etc., and has a structure resistant to heat or internal and external pressure.

In the cassette 20, a heat insulating material 17a such as silica fiber, etc. is inserted, and hidden by a cover 21. A filter 18 is respectively arranged at a gas introduction/emission vent of the cassette 20.

Additionally, the water supplying device 12 is arranged within the cassette 20 in the preferred embodiment shown in FIG. 6. However, water may be directly supplied to the reaction container 11 from the pipe 15 for supplying water without arranging the water supplying device 12, and inert gas including water vapor or air may be introduced from the pipe 14. Furthermore, the heater 17 is arranged within the cassette 20 in this preferred embodiment. However, the heater may not be arranged within the cassette 20 and may be arranged separately from the cassette.

Figure 7:
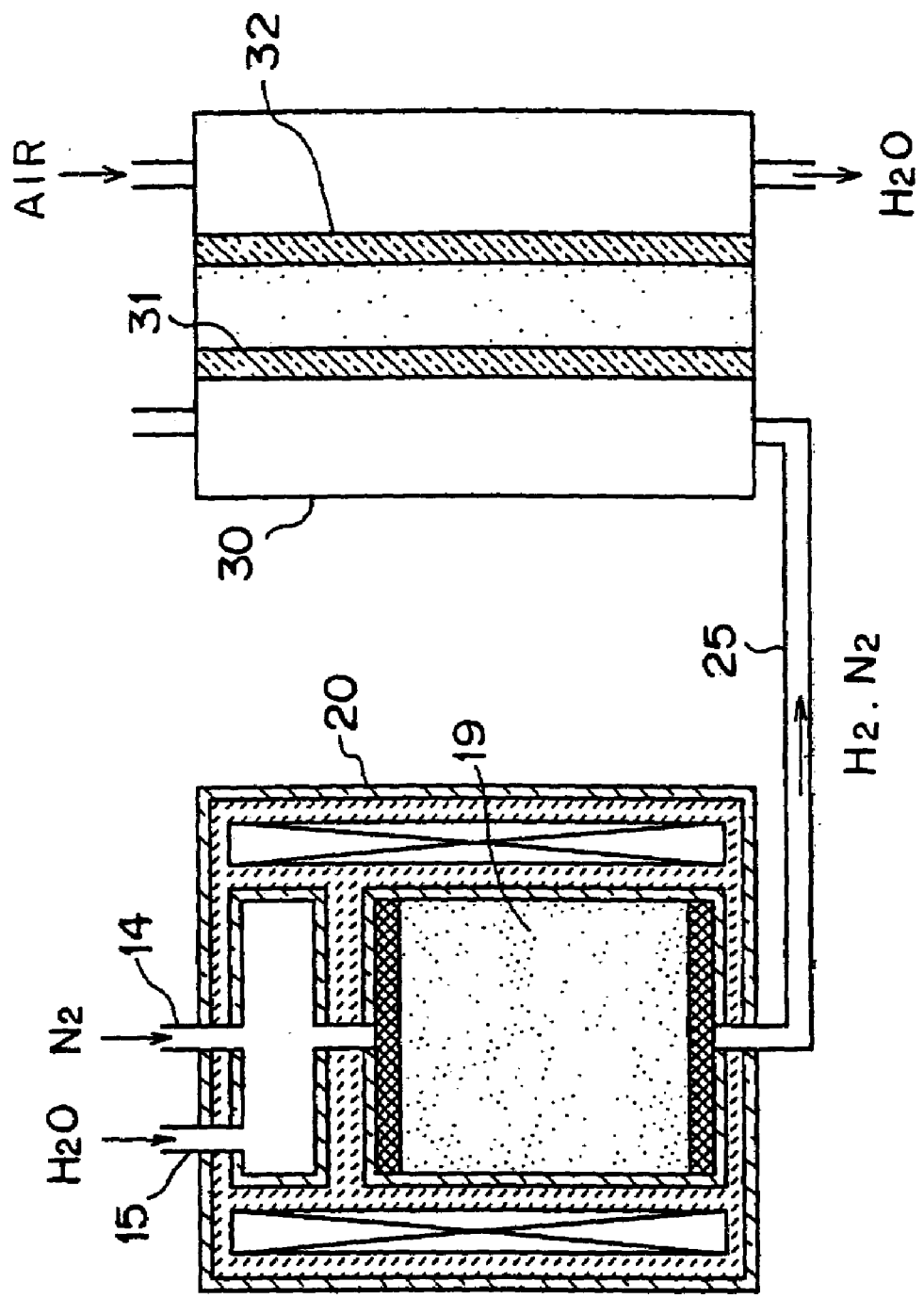
FIG. 7 shows the state where a cassette in which an oxidation/reduction iron medium is included is connected to a fuel cell.

FIG. 7 shows the state where the cassette 20 in which a reduced oxidation/reduction iron medium is included is connected to a polymer electrolyte fuel cell 30. The reduced oxidation/reduction iron medium 19 and water react with each other, so that hydrogen is generated from the cassette 20. The generated hydrogen is supplied to a fuel electrode 31 of the polymer electrolyte fuel cell 30 via a pipe 25 connected to the polymer electrolyte fuel cell 30. To an air electrode 32 of the polymer electrolyte fuel cell 30, air is introduced, and electric energy is extracted by the reaction of hydrogen and oxygen within the air.

Since the hydrogen producing method according to the present invention is configured as described above, the following effects can be obtained.

A hydrogen generation reaction rate, and the total amount of hydrogen generation per unit weight are improved by adding a different metal other than iron to iron or iron oxide, whereby hydrogen can be supplied very efficiently to a system such as a polymer electrolyte fuel cell, which requires hydrogen.

Additionally, an oxidation/reduction iron medium which has generated hydrogen can be recycled by being again reduced, and its activity is not degraded even if it is repeatedly used.

Furthermore, a reaction rate becomes faster 15 times at a reaction temperature of 400° C. in the case where iron oxide with gallium added is used, in comparison with the reaction in the case where only iron oxide is used. If iron oxide with gallium added is used, 250° C. is sufficient as a reaction temperature, which is very effective at reducing hydrogen supply energy to a system (such as apolymer electrolyte fuel cell, etc.), which requires hydrogen.

Even if a metal other than iron, which is added according to the present invention, is expensive, an amount as small as 3 mol % is effective at increasing a reaction efficiency. Therefore, hydrogen can be produced at low cost.

Still further, gas generated from the cassette does not contain impurities other than pure hydrogen and water vapor in the present invention. Therefore, a fuel electrode of a low-temperature operating fuel cell (a proton-exchange membrane type, a phosphoric type, a KOH type, etc.) is not poisoned. In addition, the present invention is configured by a simple system without a CO removal device. This produces a high economic effect.

INDUSTRIAL APPLICABILITY

The present invention is available as a hydrogen supplying means that can supply hydrogen at low cost without generating carbon monoxide, which poisons an electrode of a fuel cell, to a fuel cell for a local facility, a plant, home, or a vehicle as described above. Produced hydrogen is used not only for a fuel cell, but also for an extensive field such as a hydrogen burner, etc. Additionally, a reduced iron compound is filled in a container, which is available as a hydrogen supplying means to a fuel cell, etc., in the form of a portable hydrogen supplying cassette.

The invention claimed is:

1. A hydrogen producing method in a hydrogen supplying apparatus, comprising the steps of:
   adding one or more metals to a hydrogen generating medium stored in a portable cassette means by a coprecipitation method or by an impregnation method, wherein the hydrogen generating medium is Fe or iron oxide, and the one or more metals is not Fe and is not iron oxide and is not Mg;
   pouring water or water vapor into the portable cassette means via one of at least two passages; and supplying hydrogen from the other of said at least two passages to a hydrogen consuming device, wherein the hydrogen is generated by decomposing the water, and wherein the hydrogen supplying apparatus includes the portable cassette means having the hydrogen generating medium and said at least two passages.

2. The hydrogen producing method according to claim 1, wherein one or more added metals are selected from a group consisting of the fourth family, the fifth family, the sixth family, and the thirteenth family of the Periodic Table for the elements.

3. The hydrogen producing method according to claim 1, wherein the one or more added metals are selected from a group consisting of Ti, Zr, V, Nb, Cr, Mo, Al, and Ga.

4. The hydrogen producing method according to claim 1, wherein the one or more added metals are selected from a group consisting of Sc, Ni, and Cu.

5. A hydrogen supplying apparatus, configured by a portable cassette, which includes a hydrogen generating medium, comprises at least two pipe installing means and at least two pipe units for coupling with the at least two pipe installing means respectively, wherein:

a main component of the hydrogen generating medium is iron or iron oxide, to which one or more different metals are added; and the cassette, into which water or water vapor is poured via one of the pipe installing means and one of the pipe units, can supply hydrogen, which is generated by decomposing the water, from the other communicating pipe installing means and the other of the pipe units to a hydrogen consuming device.

6. The hydrogen supplying apparatus according to claim 5, wherein a heater is arranged within the cassette.

7. The hydrogen supplying apparatus according to claim 5, wherein at least one of the pipe units which supplies inert gas or air is arranged in the cassette.

* * * * *